(12) United States Patent
de Souza et al.

(10) Patent No.: US 10,553,898 B2
(45) Date of Patent: Feb. 4, 2020

(54) THIN-FILM LITHIUM ION BATTERY WITH FAST CHARGING SPEED

(71) Applicant: International Business Machines Corporation, Armonk, NY (US)

(72) Inventors: Joel P. de Souza, Putnam Valley, NY (US); Yun Seog Lee, White Plains, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 15/675,296

(22) Filed: Aug. 11, 2017

(65) Prior Publication Data
US 2019/0051930 A1     Feb. 14, 2019

(51) Int. Cl.
| | | |
|---|---|---|
| H01M 10/0562 | (2010.01) | |
| H01M 4/04 | (2006.01) | |
| H01M 4/131 | (2010.01) | |
| H01M 4/1391 | (2010.01) | |
| H01M 4/525 | (2010.01) | |
| H01M 10/04 | (2006.01) | |
| H01M 10/0525 | (2010.01) | |
| H01M 10/0585 | (2010.01) | |

(52) U.S. Cl.
CPC ..... *H01M 10/0562* (2013.01); *H01M 4/0421* (2013.01); *H01M 4/131* (2013.01); *H01M 4/1391* (2013.01); *H01M 4/525* (2013.01); *H01M 10/0436* (2013.01); *H01M 10/0525* (2013.01); *H01M 10/0585* (2013.01)

(58) Field of Classification Search
None
See application file for complete search history.

(56) References Cited

U.S. PATENT DOCUMENTS

| | | | |
|---|---|---|---|
| 8,815,450 B1 | 8/2014 | Bates | |
| 2012/0214064 A1* | 8/2012 | Sabi | H01M 4/5825 |
| | | | 429/211 |
| 2013/0071753 A1 | 3/2013 | Kim et al. | |
| 2014/0178769 A1 | 6/2014 | Pirk et al. | |
| 2015/0047767 A1 | 2/2015 | Sano | |

(Continued)

OTHER PUBLICATIONS

Park, et al., "Dendrite-Suppressed Lithium Plating from a Liquid Electrolyte via Wetting of Li3N", Advanced Energy Materials, Jul. 10, 2017, 1700732, pp. 1-7.

(Continued)

*Primary Examiner* — Alix E Eggerding
(74) *Attorney, Agent, or Firm* — Scully, Scott, Murphy & Presser, P.C.; L. Jeffrey Kelly, Esq.

(57) ABSTRACT

A solid-state lithium-based battery having fast charging and recharging speeds (above 3 C) is provided by including a nitrogen-enriched lithiated cathode material surface layer between the lithiated cathode material layer and the lithium-based solid-state electrolyte layer. The nitrogen-enriched lithiated cathode material surface layer can be formed by introducing nitrogen into a lithiated cathode material. The nitrogen can be introduced during the final stage of a deposition process or by utilizing a different process, such as, for example, thermal nitridation, than a deposition process.

20 Claims, 7 Drawing Sheets

(56) References Cited

U.S. PATENT DOCUMENTS

| | | | |
|---|---|---|---|
| 2015/0147659 A1* | 5/2015 | Kato | H01M 10/0562 |
| | | | 429/304 |
| 2016/0141602 A1* | 5/2016 | Parans Paranthaman | ............... |
| | | | H01M 4/485 |
| | | | 429/221 |
| 2016/0351950 A1 | 12/2016 | Ohuchi et al. | |
| 2017/0018767 A1* | 1/2017 | Park | H01M 10/0569 |
| 2018/0301699 A1* | 10/2018 | Liang | H01M 4/133 |

OTHER PUBLICATIONS

International Search Report dated Nov. 28, 2018, received in International Application No. PCT/IB2018/055609.

* cited by examiner

THIN-FILM LITHIUM ION BATTERY WITH FAST CHARGING SPEED

BACKGROUND

The present application relates to an all solid-state thin-film battery and a method of forming the same. More particularly, the present application relates to a solid-state lithium-based battery that exhibits fast charging speeds and a method of forming such a thin-film battery.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain flammable and potentially toxic materials that may leak and may be subject to governmental regulations. As such, it is desired to provide an electrical power supply that is safe, solid-state and rechargeable over many charge/discharge life cycles.

One type of an energy-storage device that is small and light weight, contains non-toxic materials and that can be recharged over many charge/discharge cycles is a solid-state, lithium-based battery. Lithium-based batteries are rechargeable batteries that include two electrodes implementing lithium. In conventional lithium-based rechargeable batteries, the charging speed is typically from 0.8 C to 3 C, wherein C is the total battery capacity per hour. In such solid-state batteries, the charging speed can be limited by the highly resistive cathode material, resistive electrolyte materials, resistive interfaces, and/or metallic lithium dendrite formation under large voltage biases. In view of the above, there is a need for providing lithium-based rechargeable batteries that can be charged at faster speeds than conventional lithium-based rechargeable batteries.

SUMMARY

A solid-state lithium-based battery having fast charging/recharging speeds (above 3C) is provided by including a nitrogen-enriched lithiated cathode material surface layer between the lithiated cathode material layer and the lithium-based solid-state electrolyte layer. The solid-state lithium-based battery of the present application is a thin-film battery that is small and light weight. The term "thin-film battery" is used throughout the present application to denote a battery whose thickness is 100 µm or less. The nitrogen-enriched lithiated cathode material surface layer can be formed by introducing nitrogen into a lithiated cathode material. The nitrogen can be introduced during the final stage of a deposition process or by utilizing a different process, such as, for example, thermal nitridation, than a deposition process.

In one aspect of the present application, a solid-state lithium-based battery is provided. In one embodiment, the solid-state lithium-based battery may include a bottom electrode. A battery material stack is located on a surface of the bottom electrode. The battery material stack includes a lithiated cathode material layer, a nitrogen-enriched lithiated cathode material surface layer located on the lithiated cathode material layer, and a lithium-based solid-state electrolyte layer located on the nitrogen-enriched lithiated cathode material surface layer. A top electrode is located on the lithium-based solid-state electrolyte layer of the battery material stack. In some embodiments and during charging/recharging, a lithium accumulation layer is formed between the lithium-based solid-state electrolyte layer of the battery material stack and the top electrode. In other embodiments, a lithiated nitrogen-rich interfacial layer can be present between the lithium-based solid-state electrolyte layer and an anode material of the battery material stack.

In another aspect of the present application, a method of forming a solid-state lithium-based battery is provided. In one embodiment, the method may include forming a patterned sacrificial material on a surface of a bottom electrode, wherein the patterned sacrificial material contains an opening that physically exposes a portion of the surface of the bottom electrode. Next, a lithiated cathode material layer is formed on the patterned sacrificial material and on the physically exposed portion of the surface of the bottom electrode in the opening, wherein the lithiated cathode material layer includes a nitrogen-enriched lithiated cathode material surface layer. A lithium-based solid-state electrolyte layer is then formed on the nitrogen-enriched lithiated cathode material surface layer, and thereafter a top electrode is formed on the lithium-based solid-state electrolyte layer. Next, a lift-off process is performed to remove the patterned sacrificial material and materials formed on the patterned sacrificial material from the bottom electrode, while maintaining a material stack on the physically exposed portion of the surface of the bottom electrode. The material stack includes a remaining portion of each of the lithiated cathode material layer, the nitrogen-enriched lithiated cathode material surface layer, the lithium-based solid-state electrolyte layer, and the top electrode. In some embodiments, a lithiated nitrogen-rich interfacial layer can be formed between the lithium-based solid-state electrolyte layer and an anode material of the battery material stack.

DETAILED DESCRIPTION

Figure 1:
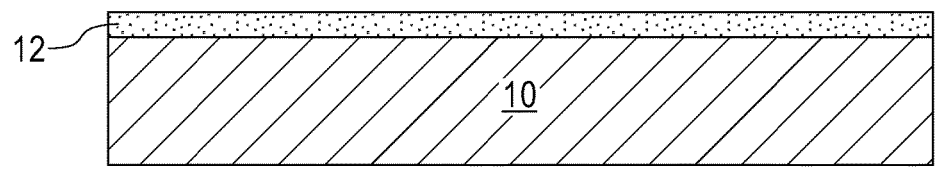
FIG. 1 is a cross sectional view of an exemplary structure including a bottom electrode located on a surface of a substrate that can be employed in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated an exemplary structure that can be employed in accordance with an embodiment of the present application. The exemplary structure of FIG. 1 includes a bottom electrode 12 located on a surface of a substrate 10. As is shown, the bottom electrode 12 is typically a continuous layer (without any intentionally formed gaps or breaks) that is present on an entirety of the substrate 10.

The substrate 10 that can be employed in the present application includes any conventional material that is used as a substrate for a solid-state lithium-based battery. In one embodiment, the substrate 10 may include one or more semiconductor materials. The term "semiconductor material" is used throughout the present application to denote a material having semiconducting properties.

Examples of semiconductor materials that may be employed as substrate 10 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

In one embodiment, the semiconductor material that may provide substrate 10 is a bulk semiconductor substrate. By "bulk" it is meant that the substrate 10 is entirely composed of at least one semiconductor material, as defined above. In one example, the substrate 10 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of Si and a silicon germanium alloy.

In another embodiment, substrate 10 is composed of a topmost semiconductor material layer of a semiconductor-on-insulator (SOI) substrate. The SOI substrate would also include a handle substrate (not shown) including one of the above mentioned semiconductor materials, and an insulator layer (not shown) such as a buried oxide below the topmost semiconductor material layer.

In any of the embodiments mentioned above, the semiconductor material that may provide the substrate 10 may be a single crystalline semiconductor material. The semiconductor material that may provide the substrate 10 may have any of the well known crystal orientations. For example, the crystal orientation of the semiconductor material that may provide substrate 10 may be {100}, {110}, or {111}. Other crystallographic orientations besides those specifically mentioned can also be used in the present application.

In another embodiment, the substrate 10 is a metallic material such as, for example, aluminum (Al), aluminum alloy, titanium (Ti), tantalum (Ta), tungsten (W), or molybdenum (Mo).

In yet another embodiment, the substrate 10 is a dielectric material such as, for example, doped or non-doped silicate glass, silicon dioxide, or silicon nitride. In yet a further embodiment, the substrate 10 is composed of a polymer or flexible substrate material such as, for example, a polyimide, a polyether ketone (PEEK) or a transparent conductive polyester. In yet an even further embodiment, the substrate 10 may be composed of a multilayered stack of at least two of the above mentioned substrate materials, e.g., a stack of silicon and silicon dioxide.

The substrate 10 that can be used in the present application can have a thickness from 10 µm to 5 mm. Other thicknesses that are lesser than, or greater than, the aforementioned thickness values may also be used for substrate 10.

In some embodiments, the substrate 10 may have a non-textured (flat or planar) surface. The term "non-textured surface" denotes a surface that is smooth and has a surface roughness on the order of less than 100 nm root mean square as measured by profilometry. In yet another embodiment, the substrate 10 may have a textured surface. In such an embodiment, the surface roughness of the textured substrate can be in a range from 100 nm root mean square to 100 µm root mean square as also measured by profilometry. Texturing can be performed by forming a plurality of metallic masks (e.g., tin masks) on the surface of a non-textured substrate, etching the non-textured substrate utilizing the plurality of metallic masks, and removing the metallic masks from the non-textured surface of the substrate. In some embodiments, the textured surface of the substrate is composed of a plurality of pyramids. In yet another embodiment, the textured surface of the substrate is composed of a plurality of cones. The plurality of metallic masks may be formed by depositing a layer of a metallic material and then performing an anneal. During the anneal, the layer of metallic material melts and balls-ups such that de-wetting of the surface of the substrate occurs.

The bottom electrode 12 may include any metallic electrode material such as, for example, titanium (Ti), platinum (Pt), nickel (Ni), aluminium (Al) and titanium nitride (TiN). In one example, the bottom electrode 12 includes a stack of, from bottom to top, titanium (Ti), platinum (Pt) and titanium (Ti). The bottom electrode 12 may be formed utilizing a deposition process including, for example, chemical vapor deposition (CVD), plasma enhanced chemical vapor deposition (PECVD), evaporation, sputtering, or plating. The bottom electrode 12 may have a thickness from 10 nm to 500 nm. Other thicknesses that are lesser than, or greater than, the aforementioned thickness values may also be used for the bottom electrode 12.

Figure 2:
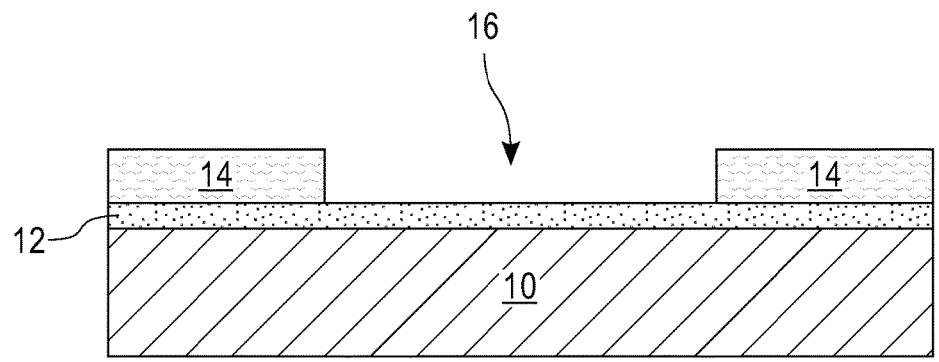
FIG. 2 is a cross sectional view of the exemplary structure of FIG. 1 after forming a patterned sacrificial material on the surface of the bottom electrode, wherein the patterned sacrificial material includes an opening that physically exposes a portion of the surface of the bottom electrode.

Referring now to FIG. 2, there is illustrated the exemplary structure of FIG. 1 after forming a patterned sacrificial material 14 on the surface of the bottom electrode 12, wherein the patterned sacrificial material 14 includes an opening 16 that physically exposes a portion of the surface of the bottom electrode 12. The opening 16 defines an area in which a solid-state lithium-based battery will be subsequently formed. Although the present application describes and illustrates a single opening 16, a plurality of openings 16 can be formed in which each opening of the plurality of openings 16 can define an area for subsequent formation of a solid-state lithium-based battery.

The patterned sacrificial material 14 can be formed by first applying a sacrificial material (not shown) to the physically exposed surface of the bottom electrode 12. In one embodiment, the sacrificial material is a photoresist material. In such an embodiment, the photoresist material may be a positive-tone photoresist material, a negative-tone photoresist material or a hybrid-tone photoresist material. The sacrificial material may be formed utilizing a deposition process such as, for example, chemical vapor deposition (CVD), plasma enhanced chemical vapor deposition (PECVD) or spin-on coating. The sacrificial material may have a thickness from 100 nm to 20 µm. Other thicknesses that are lesser than, or greater than, the aforementioned thickness values may also be used for the sacrificial material.

The deposited sacrificial material is then patterned. In one embodiment and when the sacrificial material is a photoresist material, the photoresist material may be patterned by exposing the photoresist material to a desired pattern of radiation, and thereafter the exposed photoresist material is developed utilizing a conventional resist developer to provide a patterned sacrificial material 14. When non-photoresist sacrificial materials are used, the non-photoresist sacrificial materials can be patterned by lithography and etching.

In another embodiment, the sacrificial material that provides the patterned sacrificial material 14 is a shadow mask. In such an embodiment, the shadow mask may be a pre-patterned metallic material or a pre-patterned polymeric material. The pre-patterned shadow mask material is attached to the structure shown in FIG. 1 by mechanical force or a removable adhesive.

Figure 3:
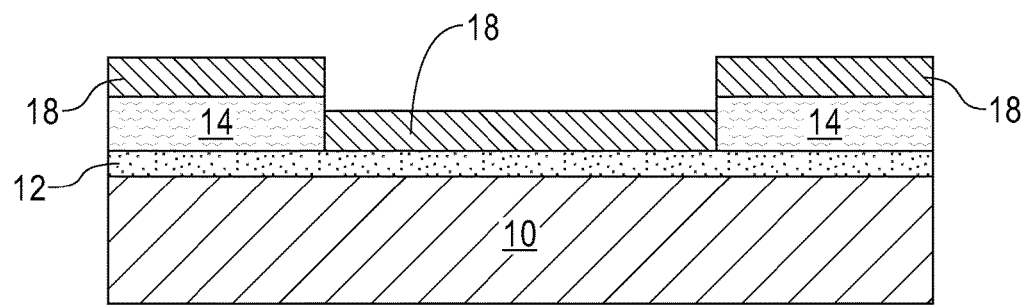
FIG. 3 is a cross sectional view of the exemplary structure of FIG. 2 after forming a lithiated cathode material on the patterned sacrificial material and on the physically exposed portion of the bottom electrode in the opening.

Referring now to FIG. 3, there is illustrated the exemplary structure of FIG. 2 after forming a lithiated cathode material 18 on the patterned sacrificial material 14 and on the physically exposed portion of the bottom electrode 12 in the opening 16.

The lithiated cathode material 18 that can be employed in the present application includes a lithium-based mixed oxide. Examples of lithium-based mixed oxides that may be employed as the lithiated cathode material 18 include, but are not limited to, lithium cobalt oxide ($LiCoO_2$), lithium nickel oxide ($LiNiO_2$), lithium manganese oxide ($LiMn_2O_4$), lithium vanadium pentoxide ($LiV_2O_5$) or lithium iron phosphate ($LiFePO_4$).

The lithiated cathode material 18 may be formed utilizing a deposition process such as, sputtering or plating. In one embodiment, the lithiated cathode material 18 is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon or any combination thereof.

The lithiated cathode material 18 may have a thickness from 10 nm to 2 µm. A smaller thickness is preferred to have lower resistance and faster charging/discharging speed. Other thicknesses that are lesser than, or greater than, the aforementioned thickness values may also be used for the lithiated cathode material 18.

Figure 4:
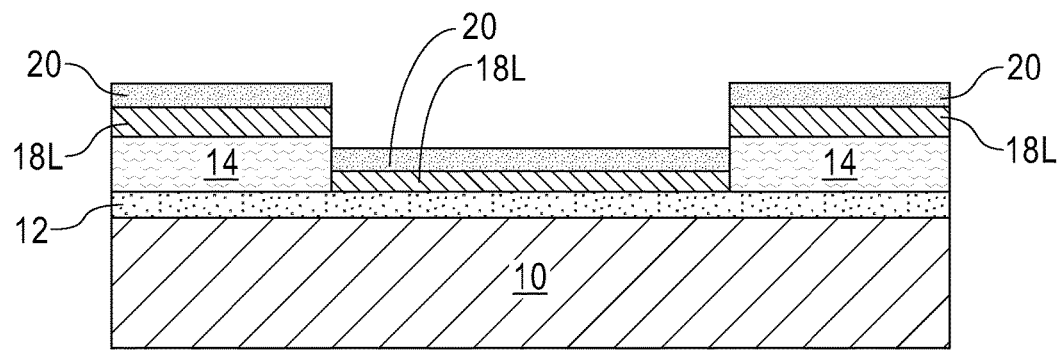
FIG. 4 is a cross sectional view of the exemplary structure of FIG. 3 after introducing nitrogen into an upper portion of the lithiated cathode material to provide a lithiated cathode material layer containing a nitrogen-enriched lithiated cathode material surface layer.

Referring now to FIG. 4, there is illustrated the exemplary structure of FIG. 3 after introducing nitrogen into an upper portion of the lithiated cathode material 18 to provide a lithiated cathode material layer 18L containing a nitrogen-enriched lithiated cathode material surface layer 20. In this embodiment, the lithiated cathode material layer 18L is composed of a remaining and non-nitrided portion of the lithiated cathode material 18, while the nitrogen-enriched lithiated cathode material surface layer 20 is composed of a nitrided upper surface portion of the lithiated cathode material 18. Thus, the lithiated cathode material layer 18L and the nitrogen-enriched lithiated cathode material surface layer 20 are each composed of the same lithiated cathode material, i.e., a lithium-based oxide.

By "nitrogen-enriched lithiated cathode material surface layer" it is meant a surface treated lithiated cathode material that has a higher nitrogen content than the original lithiated cathode material 18. In one embodiment, the nitrogen content of the nitrogen-enriched lithiated cathode material surface layer 20 is from 0.1 atomic percent to 25 atomic percent. Other nitrogen contents for the nitrogen-enriched lithiated cathode material surface layer 20 are possible and are within the scope of the present application so long as a lithium-based mixed oxide remains.

In some embodiments, the introducing of nitrogen into the lithiated cathode material 18 includes first depositing the lithiated cathode material 18, and then in a separate step different from a depositing step, nitrogen is added into an upper portion of the lithiated cathode material 18. In such an embodiment, the introducing of nitrogen into the lithiated cathode material 18 may include a thermal process, a plasma process, a gas cluster ion beam process, an ion beam process or an ion implantation process.

The thermal process that can be used to introduce nitrogen into the lithiated cathode material 18 may be referred to as a thermal nitridation process since the lithiated cathode material 18 is exposed to an ambient including nitrogen (i.e., a nitrogen-containing ambient). The thermal nitridation process may or may not include an electrical bias. When an electrical bias is employed during thermal nitridation, the electric bias is less than 0.3 W/mm$^2$.

The nitrogen-containing ambient that is employed during thermal nitridation is not in the form of a plasma. The nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, hydrogen ($H_2$), helium (He), neon (Ne), argon (Ar) and mixtures thereof.

In the thermal nitridation embodiment, the content of nitrogen ($N_2$) within the ambient employed is typically from 10% to 100%, with a nitrogen content within the ambient from 50% to 100% being more typical. In one embodiment, the thermal nitridation process can be performed at a temperature from 50° C. to 600° C.

When a plasma process is used, an electrical bias of greater than 0.3 W/mm$^2$ can be employed. The plasma process is performed by generating a plasma from one of the nitrogen-containing ambients (neat or diluted) that are mentioned above for the thermal nitridation process; thus the plasma process may be referred to a plasma nitridation process. In one embodiment, the plasma nitridation process can be performed at a temperature from 15° C. to 600° C.

When an ion beam process is employed, a beam of nitrogen ($N_2$) ions generated from an ion source such as one of the aforementioned nitrogen-containing ambients is impinged upon the lithiated cathode material 18. The ion beam process may be performed utilizing any ion beam apparatus. The energy of the ion beam process can from 1 eV to 100 eV. The ion beam process can be performed at a temperature from 15° C. to 600° C.

When a gas cluster ion beam process is employed, a cluster of nitrogen ($N_2$) ions generated from an ion source such as one of the aforementioned nitrogen-containing ambients is impinged upon the lithiated cathode material 18. The gas cluster ion beam process may be performed utilizing any gas cluster ion beam apparatus. The energy of the gas cluster ion beam process can from 10 eV to 30 eV. The gas cluster ion beam process can be performed at a temperature from 50° C. to 600° C.

When ion implantation is employed, nitrogen ($N_2$) ions generated from an ion source such as one of the aforementioned nitrogen-containing ambients are impinged upon the patterned doped metallic insulator 16. The ion implantation process may be performed utilizing any ion implantation apparatus. The energy of the ion implantation process can from 10 eV to 200 eV. The ion implantation process can be performed at a temperature from 15° C. to 600° C.

The lithiated cathode material layer 18L has a thickness that is less than the thickness of the lithium cathode material 18. In one example, the lithiated cathode material layer 18L may have a thickness from 10 nm to 20 μm. The nitrogen-enriched lithiated cathode material surface layer 20 may have a thickness from 0.1 nm to 50 nm.

Although the present application describes and illustrates an embodiment in which nitrogen is introduced into an upper portion of a lithiated cathode material utilizing a different process (i.e., a thermal process, a plasma process, a gas cluster ion beam process, an ion beam process or an ion implantation process) than that used in depositing the lithiated cathode material, the present application also contemplates an embodiment in which nitrogen is added during a final deposition stage. In such an embodiment, a precursor source material is used in a first deposition stage to provide a lithiated cathode material layer 18L, and thereafter nitrogen is added to the precursor source material during another deposition stage. In such an embodiment, the nitrogen can be added to an inert gas/oxygen admixture in an amount from 1 atomic percent to 100 atomic percent. The oxygen content may or may not be keep constant during such an embodiment.

Figure 5:
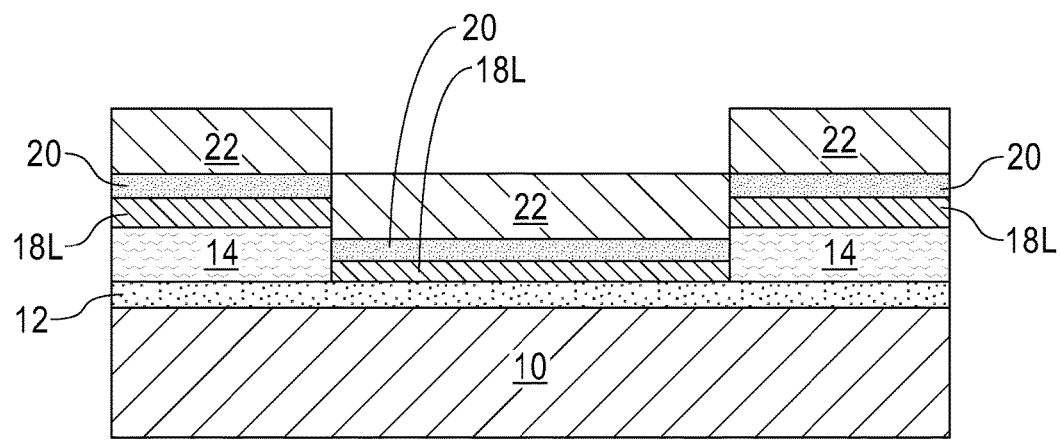
FIG. 5 is a cross sectional view of the exemplary structure of FIG. 4 after forming a lithium-based solid-state electrolyte layer on the nitrogen-enriched lithiated cathode material surface layer.

Referring now to FIG. 5, there is illustrated the exemplary structure of FIG. 4 after forming a lithium-based solid-state electrolyte layer 22 on the nitrogen-enriched lithiated cathode material surface layer 20. The lithium-based solid-state electrolyte layer 22 is a solid material that enables the conduction of lithium ions. Such materials may be electrically insulating or ionic conducting. Examples of materials that can be employed as the lithium-based solid-state electrolyte layer 22 include, but are not limited to, lithium phosphorus oxynitride (LiPON) or lithium phosphosilicate oxynitride (LiSiPON).

The lithium-based solid-state electrolyte layer 22 may be formed utilizing a deposition process such as, sputtering or plating. In one embodiment, the lithium-based solid-state electrolyte layer 22 is formed by sputtering utilizing any conventional precursor source material. Sputtering may be performed in any nitrogen-containing ambient including one of the nitrogen-containing ambients mentioned above in forming the nitrogen-enriched lithiated cathode material surface layer 20.

The lithium-based solid-state electrolyte layer 22 may have a thickness from 10 nm to 10 μm. Other thicknesses that are lesser than, or greater than, the aforementioned thickness values may also be used for the lithium-based solid-state electrolyte layer 22.

Figure 6:
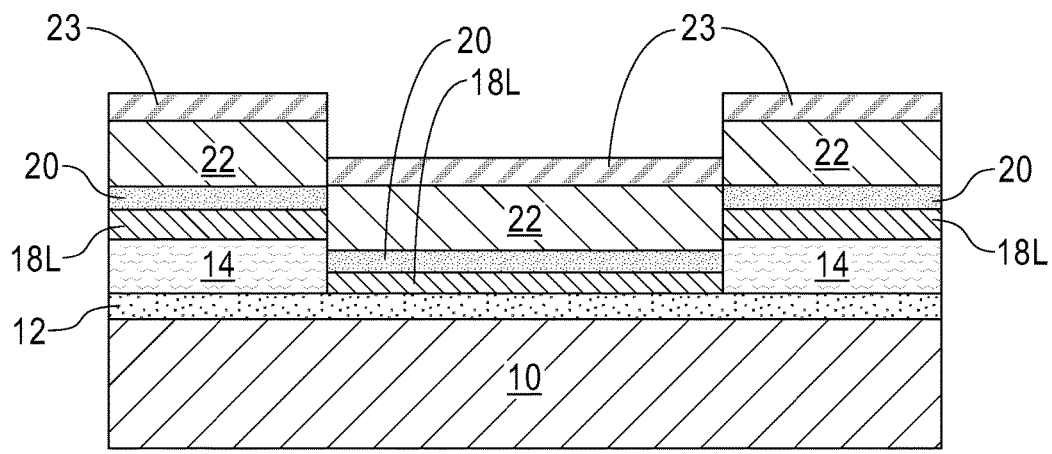
FIG. 6 is a cross sectional view of the exemplary structure of FIG. 5 after forming an anode material on the lithium-based solid-state electrolyte layer.

Referring now to FIG. 6, there is illustrated the exemplary structure of FIG. 5 after forming an anode material 23 on lithium-based solid-state electrolyte layer 22. In some embodiments, this step may be omitted. In embodiments in which the anode material 23 is omitted, a metallic lithium anode layer, i.e., a lithium accumulation layer, will be formed during a charging/recharging process. In the embodiment including the anode material 23, lithium accumulation layer formation may be prevented.

The anode material 23 that can be employed in the present application includes lithium, a lithium-based mixed oxide, a lithium alloy, silicon, or carbon-based materials. Examples of lithium-based mixed oxides that may be employed as the anode material 23 include, but are not limited to, lithium titanium oxide ($Li_4Ti_5O_{12}$).

The anode material 23 may be formed utilizing a deposition process such as, sputtering, evaporation, or plating. In one embodiment, the anode material 23 is formed by sputtering utilizing any conventional precursor source material or combination of precursor source materials. In one example, a lithium precursor source material and a titanium precursor source material are employed in forming a lithium titanium mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon or any combination thereof.

The anode material 23 may have a thickness from 10 nm to 2 μm. Other thicknesses that are lesser than, or greater than, the aforementioned thickness values may also be used for the anode material 23.

Figure 7A:
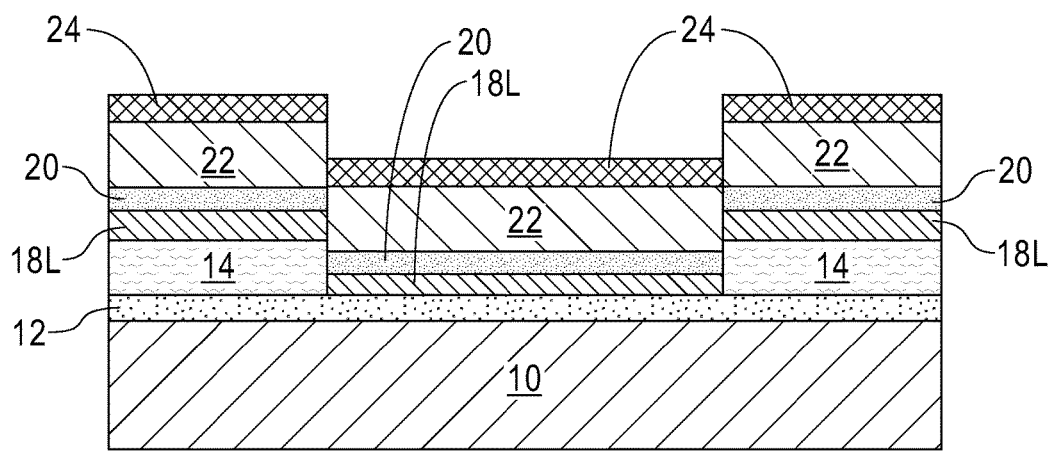
FIG. 7A is a cross sectional view of the exemplary structure of FIG. 5 after forming a top electrode on the lithium-based solid-state electrolyte layer.
Figure 7B:
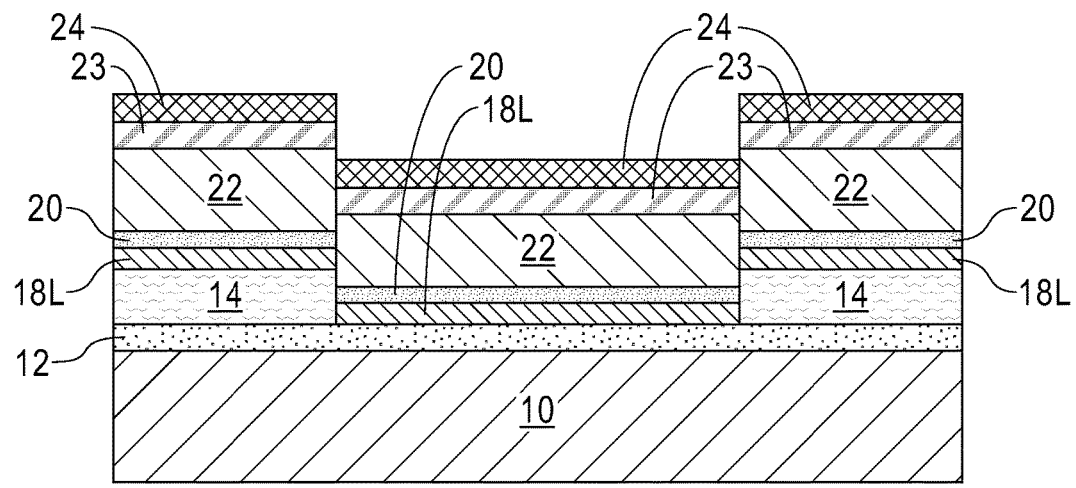
FIG. 7B is a cross sectional view of the exemplary structure of FIG. 6 after forming a top electrode on the anode material.

Referring now to FIG. 7A, there is illustrated the exemplary structure of FIG. 5 after forming a top electrode 24 on the lithium-based solid-state electrolyte layer 22; FIG. 7B shows the exemplary structure of FIG. 6 after forming the top electrode 24 on the anode layer 23.

The top electrode 24 may include any metallic electrode material such as, for example, titanium (Ti), platinum (Pt), nickel (Ni), copper (Cu) and titanium nitride (TiN). In one example, the top electrode 24 includes a stack of, from bottom to top, nickel (Ni) and copper (Cu). In one embodiment, the metallic electrode material that provides the top electrode 24 may be the same as the metallic electrode material that provides the bottom electrode 12. In another embodiment, the metallic electrode material that provides the top electrode 24 may be different from the metallic electrode material that provides the bottom electrode 12. The top electrode 24 may be formed utilizing one of the deposition processes mentioned above for forming the bottom electrode 12.

Figure 8A:
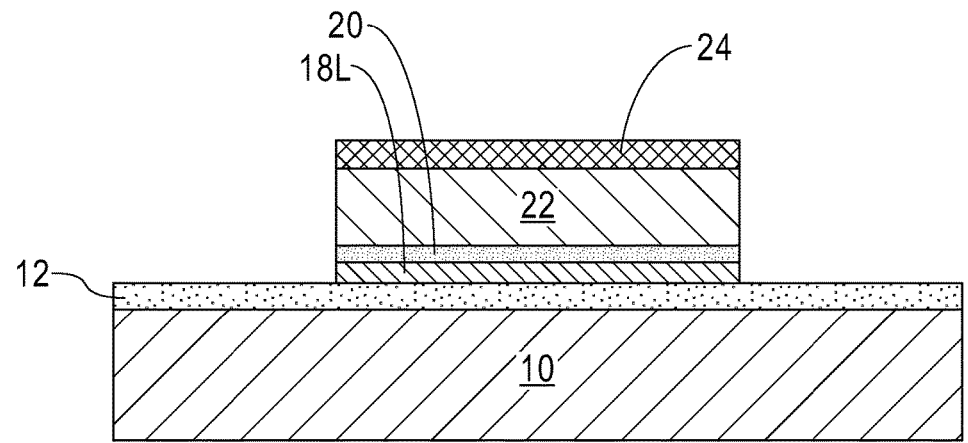
FIG. 8A is a cross sectional view of the exemplary structure of FIG. 7A after performing a lift-off process in which the patterned sacrificial material and all materials formed thereon are removed from the bottom electrode, while maintaining a material stack on the bottom electrode.

Referring now to FIG. 8A, there is illustrated the exemplary structures of FIG. 7A after performing a lift-off process in which the patterned sacrificial material 14 and all materials (18L, 20, 22, and 24) formed thereon are removed from the bottom electrode 12, while maintaining a material stack on the bottom electrode 12. The material stack includes a remaining portion of each of the lithiated cathode material layer 18L, the nitrogen-enriched lithiated cathode material surface layer 20, the lithium-based solid-state electrolyte layer 22, and the top electrode 24. The material stack is located on the physically exposed portion of the bottom electrode 12.

Figure 8B:
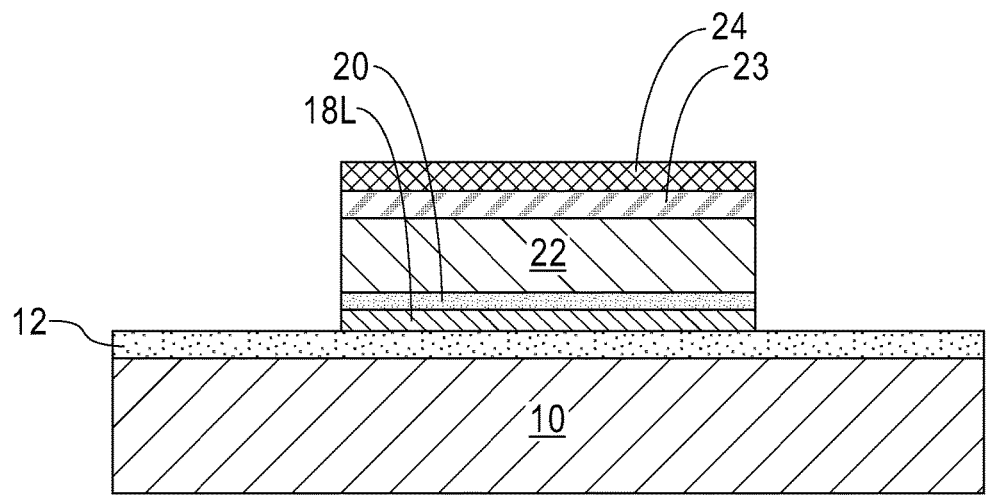
FIG. 8B is a cross sectional view of the exemplary structure of FIG. 7B after performing a lift-off process in which the patterned sacrificial material and all materials formed thereon are removed from the bottom electrode, while maintaining a material stack on the bottom electrode.

FIG. 8B illustrates the exemplary structures of FIG. 7B after performing a lift-off process in which the patterned sacrificial material 14 and all materials (18L, 20, 22, 23 and 24) formed thereon are removed from the bottom electrode 12, while maintaining a material stack on the bottom electrode 12. The material stack includes a remaining portion of each of the lithiated cathode material layer 18L, the nitrogen-enriched lithiated cathode material surface layer 20, the lithium-based solid-state electrolyte layer 22, the anode material 23 and the top electrode 24. The material stack is located on the physically exposed portion of the bottom electrode 12.

In one embodiment, the lift-off process includes removing the patterned sacrificial material 14 utilizing a solvent or etchant that is selective for removing the sacrificial material. In another embodiment, the removing does not include the use of a solvent, but instead, the mechanical force is released or release occurs by peeling the patterned sacrificial material 14 from the removable adhesive.

The exemplary structures shown in FIGS. 7A-7B illustrate solid-state lithium-based batteries in accordance with the present application. The solid-state lithium-based battery of FIG. 7A includes a bottom electrode 12, and a battery material stack (18L, 20, 22) located on a portion of the surface of the bottom electrode 12. The battery material stack (18L, 20, 22) of the solid-state lithium-based battery of FIG. 7A includes lithiated cathode material layer 18L, nitrogen-enriched lithiated cathode material surface layer 20 located on the lithiated cathode material layer 18L, and lithium-based solid-state electrolyte layer 22 located on the nitrogen-enriched lithiated cathode material surface layer 20. A top electrode 24 is located on the lithium-based solid-state electrolyte layer 22 of the battery material stack (18L, 20, 22) of the solid-state lithium-based battery of FIG. 7A.

As shown in FIG. 7A, the lithiated cathode material layer 18L, the nitrogen-enriched lithiated cathode material surface layer 20 and the lithium-based solid-state electrolyte layer 24 of the solid-state lithium-based battery have sidewall surfaces that are vertically aligned with each other. As is further shown in FIG. 7B, the top electrode 24 of the solid-state lithium-based battery has sidewall surfaces that are vertically aligned to the sidewall surfaces of the lithiated cathode material layer 18L, the nitrogen-enriched lithiated cathode material surface layer 20 and the lithium-based solid-state electrolyte layer 22 of the solid-state lithium-based battery.

Figure 9A:
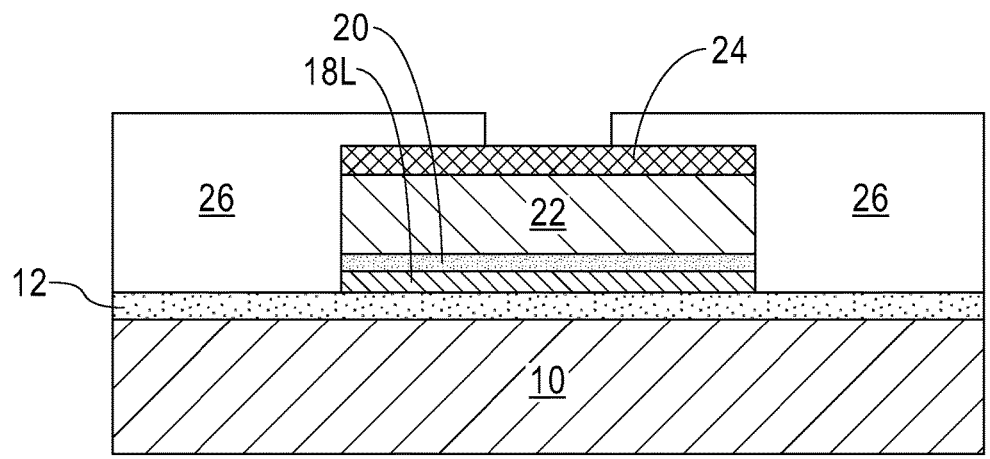
FIG. 9A is a cross sectional view of the exemplary structure of FIG. 8A after forming an air and/or moisture impermeable structure.
Figure 9B:
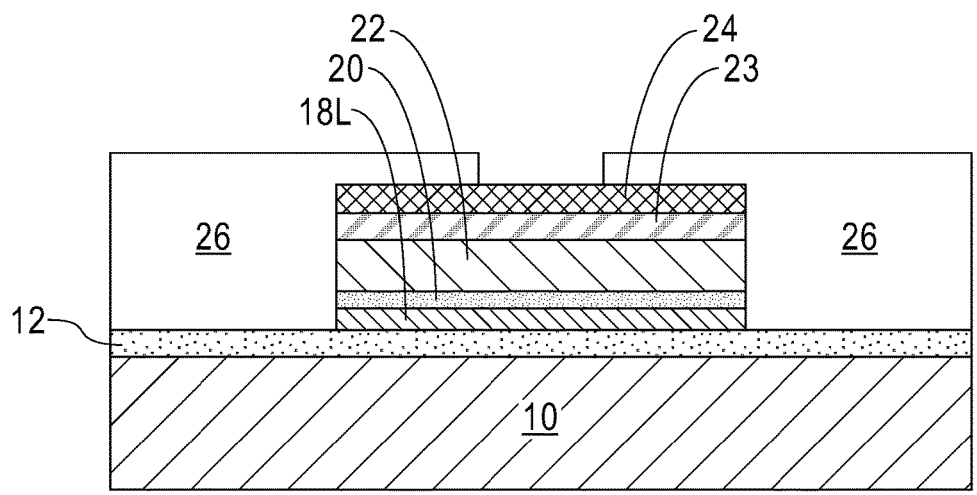
FIG. 9B is a cross sectional view of the exemplary structure of FIG. 8B after forming an air and/or moisture impermeable structure.
Figure 10:
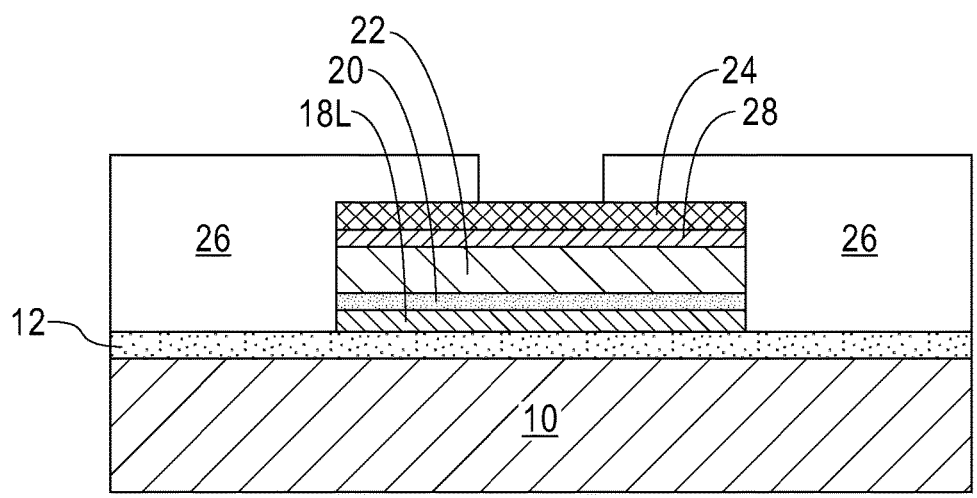
FIG. 10 is a cross sectional view after charging the resultant structure shown in FIG. 9A.

During charging/recharging of the solid-state lithium-based battery of FIG. 7A, and as shown in FIG. 9, a lithium accumulation layer 28 (i.e., an anode material) is formed between the lithium-based solid-state electrolyte layer 22 of the battery material stack (18L, 20, 22) and the top electrode 24; during the charging/recharging process the thickness of the originally formed lithium-based solid-state electrolyte layer 22 may be reduced.

The solid-state lithium-based battery of FIG. 7B includes a bottom electrode 12, and a battery material stack (18L, 20, 22, 23) located on a portion of the surface of the bottom electrode 12. The battery material stack (18L, 20, 22, 23) of the solid-state lithium-based battery of FIG. 7B includes lithiated cathode material layer 18L, nitrogen-enriched lithiated cathode material surface layer 20 located on the lithiated cathode material layer 18L, lithium-based solid-state electrolyte layer 22 located on the nitrogen-enriched lithiated cathode material surface layer 20, and anode material 23 located on the lithium-based solid-state electrolyte layer 22. A top electrode 24 is located on the anode material of the battery material stack (18L, 20, 22, 23) of the solid-state lithium-based battery of FIG. 7B.

As shown in FIG. 7B, the lithiated cathode material layer 18L, the nitrogen-enriched lithiated cathode material surface layer 20 the lithium-based solid-state electrolyte layer 24, and the anode material 23 of the solid-state lithium-based battery have sidewall surfaces that are vertically aligned with each other. As is further shown in FIG. 7B, the top electrode 24 of the solid-state lithium-based battery has sidewall surfaces that are vertically aligned to the sidewall surfaces of the lithiated cathode material layer 18L, the nitrogen-enriched lithiated cathode material surface layer 20, the lithium-based solid-state electrolyte layer 22 of the solid-state lithium-based battery, and the anode material. The solid-state lithium-based battery of FIG. 7B may be charged/recharged.

Charging/recharging of a solid-state lithium based battery of the present application may be performed utilizing conventional techniques well known to those skilled in the art. For example, a solid-state lithium-based battery of the present application can be charged/recharged by connecting the solid-state lithium-based battery of the present application to an external power supply. In one embodiment, a solid-state lithium-based battery of the present application is capable of a charge-rate of approximately 100 C when the lithiated cathode material layer thickness is thinner than 200 nm. For a conventional solid-state lithium-based battery without the nitrogen-enriched lithiated cathode material surface layer 20, the charge-rate is from 0.8 to 3 C.

Referring now to FIGS. 8A-8B, there is illustrated the exemplary structures of FIGS. 7A-7B, respectively, after forming an air and/or moisture impermeable structure 26. The air and/or moisture impermeable structure 26 includes any air and/or moisture impermeable material or multilayered stack of such materials. Examples of air and/or moisture impermeable materials that can be employed in the present application include, but are not limited to, parylene, a fluoropolymer, silicon nitride, and/or silicon dioxide. The air and/or moisture impermeable structure 26 may be formed by first depositing the air and/or moisture impermeable material and thereafter patterning the air and/or moisture impermeable material. In one embodiment, patterning may be performed by lithography and etching.

Figure 11:
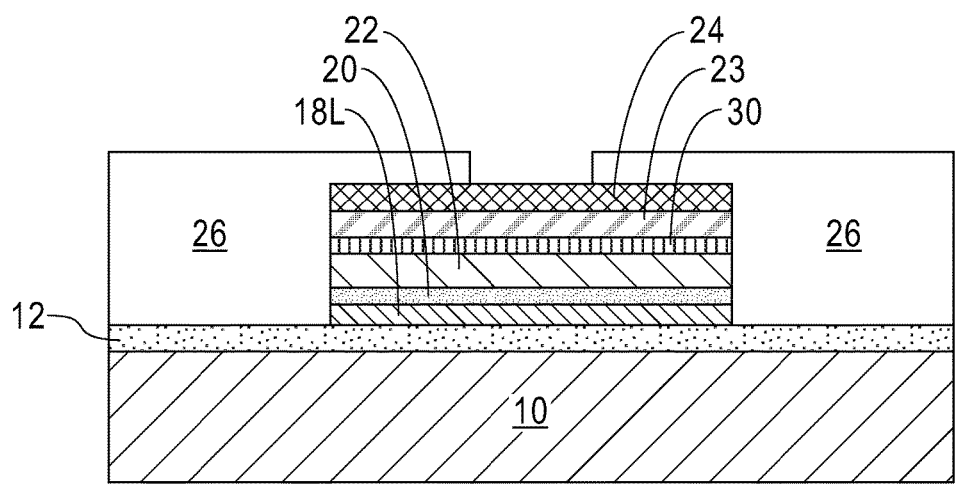
FIG. 11 is a cross sectional view of another exemplary structure of the present application in which a lithiated nitrogen-rich interfacial layer is present between the lithium-based solid-state electrolyte layer and an anode material of the battery material stack.

Referring now to FIG. 11, there is illustrated another exemplary structure of the present application in which a lithiated nitrogen-rich interfacial layer 30 is present between the lithium-based solid-state electrolyte layer 22 and an anode material 24 of the battery material stack. In this embodiment, the exemplary structure shown in FIG. 5 is first provided and then the lithiated nitrogen-rich interfacial layer 30 is formed. After forming the lithiated nitrogen-rich interfacial layer 30, the anode material 23 is formed as described above in FIG. 6 of the present application, and then processing as described in FIGS. 7B and 8B are performed.

The lithiated nitrogen-rich interfacial layer 30 includes atoms of Li and N. In some embodiments, the nitrogen content of the lithiated nitrogen-rich interfacial layer 30 can be from 0.1 atomic percent to 25 atomic percent. Other nitrogen contents are possible for the lithiated nitrogen-rich interfacial layer 30. In one embodiment, the nitrogen-rich interfacial layer 30 can be composed of $LiN_3$. In another embodiment, the nitrogen-rich interfacial layer 30 can be composed of elements that comprise the lithium-based solid-state electrolyte layer 22 plus added nitrogen.

In one embodiment, the lithiated nitrogen-rich interfacial layer 30 can be formed by introducing nitrogen into an upper surface of the lithium-based solid-state electrolyte layer 22 utilizing any of the processes mentioned above in forming nitrogen-enriched lithiated cathode material surface layer 20. In yet another embodiment, the lithiated nitrogen-rich interfacial layer 30 can be formed by a deposition process such as, for example, chemical vapor deposition or sputtering. The lithiated nitrogen-rich interfacial layer 30 can have a thickness from 0.1 nm to 50 nm; other thicknesses are also possible for the lithiated nitrogen-rich interfacial layer 30.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A solid-state lithium-based battery comprising:
   a bottom electrode;
   a battery material stack located a surface of the bottom electrode, wherein the battery material stack includes a lithiated cathode material layer, a nitrogen-enriched lithiated cathode material surface layer located on the lithiated cathode material layer, a lithium-based solid-state electrolyte layer located on the nitrogen-enriched lithiated cathode material surface layer; and
   a top electrode located on the lithium-based solid-state electrolyte layer of the battery material stack.

2. The solid-state lithium-based battery of claim 1, further comprising an anode material located between the lithium-based solid-state electrolyte layer and the top electrode.

3. The solid-state lithium-based battery of claim 2, further comprising a lithiated nitrogen-rich interfacial layer located between the anode material and the lithium-based solid-state electrolyte layer.

4. The solid-state lithium-based battery of claim 1, further comprising an air and/or moisture impermeable structure located on physically exposed surfaces of the bottom electrode and surrounding the battery material stack.

5. The solid-state lithium-based battery of claim 1, wherein the lithiated cathode material layer, the nitrogen-enriched lithiated cathode material surface layer and the lithium-based solid-state electrolyte layer have sidewall surfaces that are vertically aligned with each other.

6. The solid-state lithium-based battery of claim 5, wherein the top electrode has sidewall surfaces that are vertically aligned to the sidewall surfaces of the lithiated cathode material layer, the nitrogen-enriched lithiated cathode material surface layer and the lithium-based solid-state electrolyte layer.

7. The solid-state lithium-based battery of claim 1, wherein the nitrogen-enriched lithiated cathode material surface layer is composed of a same material as the lithiated cathode material layer.

8. The solid-state lithium-based battery of claim 7, wherein the nitrogen-enriched lithiated cathode material surface layer contains a nitrogen content of from 0.1 percent to 25 percent.

9. The solid-state lithium-based battery of claim 7, wherein the nitrogen-enriched lithiated cathode material surface layer and the lithiated cathode material layer are both composed of $LiCoO_2$, and the lithium-based solid-state electrolyte layer is composed of LiPON.

10. The solid-state lithium-based battery of claim 8, wherein the bottom electrode is composed of a stack of titanium (Ti), platinum (Pt) and titanium, and the top electrode is composed of a stack of nickel (Ni) and copper (Cu).

11. A method of forming a solid-state lithium-based battery, the method comprising:
    forming a patterned sacrificial material on a surface of a bottom electrode, wherein the patterned sacrificial material contains an opening that physically exposes a portion of the surface of the bottom electrode;

forming a lithiated cathode material layer on the patterned sacrificial material and on the physically exposed portion of the surface of the bottom electrode in the opening, wherein the lithiated cathode material layer includes a nitrogen-enriched lithiated cathode material surface layer;

forming a lithium-based solid-state electrolyte layer on the nitrogen-enriched lithiated cathode material surface layer;

forming a top electrode on the lithium-based solid-state electrolyte layer; and performing a lift-off process to remove the patterned sacrificial material and materials formed on the patterned sacrificial material from the bottom electrode, while maintaining a material stack on the physically exposed portion of the surface of the bottom electrode, wherein the stack includes a remaining portion of each of the lithiated cathode material layer, the nitrogen-enriched lithiated cathode material surface layer, the lithium-based solid-state electrolyte layer, and the top electrode.

12. The method of claim 11, further comprising charging or recharging the solid-state lithium-based battery, wherein during the charging or recharging a lithium accumulation layer forms between the lithium-based solid-state electrolyte layer and the top electrode.

13. The method of claim 11, further comprising forming an air and/or moisture impermeable structure located on physically exposed surfaces of the bottom electrode and surrounding the battery material stack.

14. The method of claim 11, wherein the forming the lithiated cathode material layer including the nitrogen-enriched lithiated cathode material surface layer comprises:
   depositing a lithiated cathode material; and
   introducing nitrogen into an upper portion of the lithiated cathode material.

15. The method of claim 14, wherein the introducing the nitrogen comprises a thermal process, a plasma process, a gas cluster ion beam process, an ion beam process or an ion implantation process.

16. The method of claim 14, wherein the introducing the nitrogen comprises adding nitrogen into a precursor source used for the depositing the lithiated cathode material.

17. The method of claim 11, wherein the nitrogen-enriched lithiated cathode material surface layer is composed of a same material as the lithiated cathode material layer.

18. The method of claim 11, further comprising:
   forming a lithiated nitrogen-rich interfacial layer on said lithium-based solid-state electrolyte layer; and
   forming an anode material on said lithiated nitrogen-rich interfacial layer.

19. The method of claim 18, wherein said forming the lithiated nitrogen-rich interfacial layer comprises introducing nitrogen into an upper portion of said lithium-based solid-state electrolyte layer, wherein said introducing comprises a thermal process, a plasma process, a gas cluster ion beam process, an ion beam process or an ion implantation process.

20. The method of claim 18, wherein said forming the lithiated nitrogen-rich interfacial layer comprises a deposition process.

* * * * *